United States Patent [19]

Carugati et al.

[11] Patent Number: 5,382,559
[45] Date of Patent: Jan. 17, 1995

[54] PROCESS FOR PRODUCING ACTIVATED CHARCOAL

[75] Inventors: Angelo Carugati, Manera; Gastone Del Piero; Riccardo Rausa, both of Milan, all of Italy

[73] Assignee: Eniricerche S.p.A., Milan, Italy

[21] Appl. No.: 35,207

[22] Filed: Mar. 22, 1993

[30] Foreign Application Priority Data

Apr. 2, 1992 [IT] Italy .................... MI92A000794

[51] Int. Cl.⁶ .................... C01B 31/12; B01J 20/20
[52] U.S. Cl. ..................... 502/427; 502/437
[58] Field of Search .................... 502/427, 437

[56] References Cited

U.S. PATENT DOCUMENTS

| | | |
|---|---|---|
| 3,726,808 | 4/1973 | Wennerberg ............ 502/427 |
| 3,817,874 | 6/1974 | Wennerberg et al. . |
| 3,833,514 | 9/1974 | Wennerberg et al. ........ 502/427 |
| 4,082,694 | 4/1978 | Wennerberg et al. . |
| 4,728,444 | 3/1988 | Clapper et al. .......... 252/8.551 |
| 4,788,360 | 11/1988 | Calemma ............ 44/608 |
| 5,064,805 | 11/1991 | Otowa . |

FOREIGN PATENT DOCUMENTS 393677  6/1933  United Kingdom ........... 502/427

*Primary Examiner*—Paul E. Konopka
*Attorney, Agent, or Firm*—Oblon, Spivak, McClelland, Maier & Neustadt

[57] ABSTRACT

Process for preparing activated charcoal by means of the thermal treatment of potassium humates or humic acids, deriving from coal oxidation, in the presence of an activating agent.

5 Claims, No Drawings

PROCESS FOR PRODUCING ACTIVATED CHARCOAL

The present invention relates to a novel process for preparing activated charcoal by starting from potassium humates or humic acids, derived from coal oxidation, in the presence of an activating agent, and to the resulting activated charcoal.

The activated charcoal is a porous and microcrystalline carbonaceous material. The commercial products have a surface area generally comprised within the range of from 500 to 1500 m$^2$/g.

The activated charcoals can contain small amounts of oxygen and hydrogen which are chemically combined as various functional groups such as carbonyl, carboxy, phenol, lactone and ether groups.

Also mineral materials can be contained, reported as ash or combustion residue, up to a maximal value of 20% by weight.

The presence in the activated charcoal of very fine pores (micropores) supplies a high internal surface area, on which the high adsorbing properties of activated charcoal are based.

Nearly all of the carbonaceous materials of animal, vegetable or mineral origin can be used as the raw material for producing activated charcoal. However, due to economical reasons, the main methods for preparing activated charcoals to be used in the liquid phase start from lignites, coals, wood and paper processing residues. Activated charcoals to be used for gas phase adsorption are produced, on the contrary, by starting from coconut shells, coal or petroleum residues.

The activated charcoals can essentially be prepared by means of two processes:

(a) chemical activation in the presence of activating substances which limit tar formation. The activating agent (for example $ZnCl_2$, $H_3PO_4$, KOH, $K_2S$, KCNS) performs the function of degrading or dehydrating the organic molecules on the charring or calcination step, and must be removed at process end in order to liberate the porous structure;

(b) gas activation, by means of combined oxygen containing gases, such as steam and $CO_2$.

Among the processes belonging to the first group, U.S. Pat. No. 3,642,657 discloses the production of activated charcoal by means of the oxidation of petroleum coke with nitric acid, decarboxilation of the resulting acidic coke, treatment with KOH and activation with $CO_2$.

U.S. Pat. No. 3,726,808 discloses the production of activated charcoal by preparing acidic coke, neutralizing the resulting acidic coke with KOH, pyrolysis of salt and hydrolitic desulfuration of the pyrolysate with steam.

U.S. Pat. No. 4,082,694 discloses an improved process for preparing activated coal from coke through controlled thermal steps.

European patent application EP-A-366,796 discloses a process for preparing activated charcoal by starting from "mesocarbon microbeads".

All these processes suffer from several drawbacks, in particular either they are very complex or, as disclosed in U.S. Pat. No. 4,082,694 and EP-A-366,796, they require the use of a large excess of activating agent, in particular potassium hydroxide.

The present Applicant found now, according to the present invention, that potassium humates or humic acids, derived from coal oxidation, constitute a suitable raw material for activated charcoal production. In particular, the above said humic acids from coal, or their potassium salts, can be activated, as a function of the desired surface area of activated charcoal, with variable amounts of activating agent, by means of a simplified and cheaper process than as known from the prior art.

In accordance therewith, a first aspect of the present invention relates to a process for producing activated charcoal by means of the activation of a carbonaceous substance and thermal treatment of the so activated carbonaceous substance, characterized in that:

(a) a carbonaceous substance selected from potassium humates, humic acids and their mixtures derived from coal oxidation, i s mixed with an activating agent selected from KOH or $K_2CO_3$ or their mixtures;

(c) said mixture is heat treated at a temperature comprised within the range of from 400° to 1,200° C.;

(d) the resulting activated charcoal recovered by separating the activating agent, which is then recycled.

According to the preferred embodiment of the present invention, the activating agent is KOH and the activating temperature is comprised within the range of from 700° to 1,000° C.

The overall ratio, by weight, of the activating agent to potassium humates (or humic acids) is comprised within the range of from 0.1:1 to 10:1, preferably of from 0.2:1 to 5:1.

Potassium humates and the corresponding humic acids used in the present invention are products which are obtained by means of partial coal oxidation.

As known, such an oxidation can be generally carried out by using classic oxidizers ($O_2$, $KMnO_4$, $HNO_3$ and so on). In particular, the oxidation with oxygen can be both carried out in aqueous slurry, as disclosed in ZA 88/4770, and under dry conditions, as reported in U.S. Pat. No. 4,788,360.

The humates are that fraction of oxidized coal which is soluble in aqueous solutions of alkali metal or ammonium hydroxides. In particular, the potassium humates used in the process according to the present invention are that fraction of oxidized coal which is soluble in aqueous potassium hydroxide.

Humic acids are obtained by acidifying alkali metal or ammonium humates.

The chemical characteristics of the products obtained in that way, referred to as "regenerated humic acids" (or humates), are decidedly different from those of the natural analogues, with which, however, they share the name, based on a solubility criteria which is the one which, as the only criteria, defines such a class of substances.

As known from technical literature, the products obtained by means of coal oxidation under dry conditions are different from those of natural origin (for example, extracted from peats or lignites) essentially owing to a higher molecular weight, a higher aromatic character with a high level of oxygen containing functional groups, mainly of phenolic and carboxy nature.

The potassium humates (or the corresponding humic acids) used in the present invention are those which can be obtained by means of any processes of coal oxidation as described hereinabove.

According to the preferred embodiment, the humic acids or humates of the present invention are produced by means of the process disclosed in U.S. Pat. No.

4,788,360. Said process consists of dry coal oxidation in a fluidized bed reactor with oxygen (or oxygen-nitrogen mixtures) at a temperature comprised within the range of from 150° to 300° C. and under a partial oxygen pressure comprised within the range of from 1.1 to 10 atm. Potassium humates are obtained by submitting the reaction mixture to extraction with aqueous potassium hydroxide; humic acids can be possibly obtained by acidifying the aqueous solution of the same potassium humates or of any alkali metal or ammonium humates.

The mixture of humic acids and activating agent can be prepared by mixing an aqueous solution, or dispersion, of humic acids or potassium humates, with the desired amount of activating agent neat, or diluted with water.

The resulting solution or dispersion is then dried before being sent to the activation step. According to an alternative route, the humic acids or their potassium salts are dry blended with neat activating agent.

The activation of humic acids and/or humates is carried out under an inert atmosphere, for example under a nitrogen or argon atmosphere.

The activation is carried out by heating humic acids in the presence of the activating agent, at a temperature comprised within the range of from 400° to 1,200° C., preferably 700°–1,000° C.

The heating rate and the end heating time are not critical to the invention. However, one may advantageously operate with a heating rate comprised within the range of from 1° C./minute to 100° C./minute.

The mixture of potassium humates, or humic acids with the activating agent can be directly heated up to the end activation temperature, and then said mixture can be kept at this temperature for a stay time which is a function of the end temperature reached, for indicative purposes comprised within the range of from 0.1 to 3 hours.

According to an alternative operating way, the activation can be carried out by heating at a first lower temperature, comprised within the range of from 350° to 450° C., with an indicative stay time of approximately 1 hour, and at a subsequent higher temperature comprised within the range of from 700° to 1,000° C., with stay time comprised within the range of from 0.1 to 3 hours.

The resulting activated charcoal is then washed, after cooling, with water or acidic aqueous solutions, in order to liberate the pores and eliminate or reduce the alkalinity, while simultaneously recovering the activating agent useful for a subsequent activation step.

The activated charcoal produced eventually has a surface area, as determined by the B.E.T. method in nitrogen (nitrogen adsorption-desorption at 77° K.), comprised within the range of from 500 to 4,000 m²/g, is essentially constituted by micropores prevailingly having a shorter diameter than 20 Ångstroms and has a poured density which, before the compaction, is comprised within the range of from 0.05 to 0.5 g/cm³.

The different physical-chemical properties of activated charcoals obviously are a function of different parameters, such as the type of humate or humic acid used as the starting material, the thermal treatment, but, above all, the activating agent: humate (or humic acid) ratio.

The following experimental examples are reported in order to better illustrate the present invention.

EXAMPLE 1

Potassium humates obtained by oxidizing Sulcis coal, according to the process disclosed in U.S. Pat. No. 4,788,360, are used. In particular, the oxidation of Sulcis coal, ground to a particle size comprised within the range of from 200 to 600 microns, is carried out at 220° C. in air, under a pressure of 6 bars gauge. The resulting oxidized coal is submitted to the extraction with 2.1N KOH, with the ratio of oxidized coal:KOH (91%) being of 2.14. In that way, aqueous solutions of potassium humates are obtained.

The corresponding humic acids display the following characteristics:

| *ash (% by weight, dry base): | 3.3 |
|---|---|
| *elemental analysis (% by weight d.a.f.): | |
| *carbon | 64.35 |
| *hydrogen | 3.27 |
| *nitrogen | 1.99 |
| *sulfur | 3.60 |
| *oxygen | 26.78 |
| *H/C | 0.61 |
| *O/C | 0.32 |

The relevant potassium humates contain 25% of potassium, corresponding to 36% of KOH.

A sample of potassium humates, such as to contain 8 g of humic acids and a variable percent potassium content, added as a concentrated aqueous solution of KOH, is dried (at 80° C. under vacuum) and then is submitted to thermal treatment in a Heraeus tubular furnace (ROF 7/50) at atmospheric pressure, under a nitrogen flowing stream (as an alternative route, sample Nos. 1 and 2 of Table 1 and the samples of Tables 3 and 4 were treated in an atmospheric thermobalance Leco type TGA 500 under a nitrogen atmosphere).

The thermal treatment comprises a first step at the temperature of 385° C. (step 1), with a heating rate of 5° C./minute, and with the sample being kept 1 hour under such conditions.

The temperature is then increased up to 850° C. (step 2) at a heating rate of 5° C./minute, and then is kept 2 hours at that temperature.

After cooling to room temperature, the reaction product is washed with water at a neutral pH value, and dried.

Table 1 reports, for different weight percent contents of potassium in the initial dry humate, the weight losses occured due to the thermal treatment, the values of B.E.T. surface area (m²/g), and the values of specific pore volume (cm³/g).

The determinations of surface areas were carried out with Carlo Erba's instrument Sorptomatic 1800Milestone 200 Multipoint.

TABLE 1

| No. | K % | Charring weight Loss | B.E.T. surface area | Specific pore volume |
|---|---|---|---|---|
| 1 | 14 | 47 | 642 | 0.438 |
| 2 | 25 | 40 | 1825 | 1.191 |
| 3 | 39 | 40 | 2249 | 1.501 |
| 4 | 47 | 40 | 2590 | 1.400 |
| 5 | 52 | 39 | 3798 | 2.465 |

EXAMPLE 2

Comparison Example 8 grams of commercial humic acids of natural origin, obtained from Fluka (Cat. No. 53680), having the following composition (based on organic matter):

C=63.1%, H=3.9%, N=1.6% ; S=3.6%; O=27.9%; H/C=0.74; O/C=0.33, is treated according to as disclosed in Example 1. The potassium humate obtained after drying is submitted to thermal treatment according to such modalities as reported hereinabove.

Table 2 displays the weight losses recorded during the thermal treatment of the samples with various potassium levels, the B.E.T. surface area values and the specific porous volume.

TABLE 2

| No. | K % | Charring weight loss | B.E.T. surface area | Specific pore volume |
| --- | --- | --- | --- | --- |
| 7 | 14 | 46 | 502 | 0.392 |
| 8 | 25 | 37 | 1080 | 0.854 |
| 9 | 39 | 42 | 1972 | 1.364 |

EXAMPLE 3

The process of preparation of humic acids by starting from Sulcis coal as disclosed in Example 1, leads to the production of a (KOH) basic solution of humates.

A representative portion of this solution was dried at 80° C. under vacuum.

14 grams of the resulting humates, characterized by a potassium weight level of 25%, were submitted to thermal treatment, analogously to specified in Examples 1 and 2, but with the temperatures in steps 1 and 2 being varied according to as reported in Table 3. The sample No. 16, whose data is reported in the same table, on the contrary, was submitted to a single-step thermal treatment, with a stay time of 2 hours at the end temperature of 900° C.

The heating rate was of 5° C./minute for all samples. The resulting products were treated analogously to as specified in Example 1.

The results of the characterization of the activated charcoals obtained in this case, expressed as specific surface area and specific pore volume values, are reported in following Table 3.

TABLE 3

| No. | Temperature | Charring weight Loss | B.E.T. surface area | Specific pore volume |
| --- | --- | --- | --- | --- |
| 10 | 385/750 | 34 | 1334 | 0.819 |
| 11 | 385/850 | 38 | 1674 | 1.081 |
| 12 | 385/900 | 39 | 1748 | 1.236 |
| 13 | 385/950 | 41 | 1744 | 1.380 |
| 14 | 420/900 | 38 | 1657 | 1.113 |
| 15 | 350/900 | 37 | 1734 | 1.254 |
| 16 | 900 | 37 | 1822 | 1.270 |

EXAMPLE 4

The same products as of the preceding example were submitted to thermal treatment, with the same modalities as of Example 1, in two steps, but varying the stay times at the end temperature according to as reported in following Table 4. The heating rate of samples Nos. 17 and 18 was of 5° C./minute, of sample was of 50° C./minute. The results of the characterization of the resulting activated charcoals are also reported in following Table 4.

TABLE 4

| No. | Temperature °C. | Time minutes | Heating rate °C./minutes | B.E.T. surface area | Specific pore volume |
| --- | --- | --- | --- | --- | --- |
| 17 | 385/900 | 60 | 5 | 1508 | 0.909 |
| 18 | 385/900 | 30 | 5 | 1591 | 0.936 |
| 19 | 385/900 | 60 | 50 | 1641 | 1.026 |

The weight losses during the charring step (expressed as % by weight, based on pristine products) resulted to be comprised within the range of from 35 to 36%.

EXAMPLE 5

Potassium humates obtained from the oxidation of Montana Rosebud coal, according to the process disclosed in U.S. Pat. No. 4,788,360, are used. In particular, said humates are prepared by oxidizing with air the above said coal, ground to a particle size comprised within range of from 200 to 600 microns, at 185° C. and under a pressure of 6 bars gauge. The so oxidized coal is subsequently extracted with 2.1N KOH, with the ratio of oxidized coal:KOH (91%) being of 0.99. In that way, aqueous solutions of potassium humates are obtained.

The corresponding humic acids have the following characteristics:

| | |
| --- | --- |
| *ash (% by weight, dry base): | 7.6 |
| *elemental analysis (% by weight d.a.f.): | |
| *carbon | 66.94 |
| *hydrogen | 4.09 |
| *nitrogen | 1.37 |
| *sulfur | 0.50 |
| *oxygen | 27.10 |
| *H/C | 0.73 |
| *O/C | 0.30 |

The relevant potassium humates contain 25% of potassium, corresponding to 36% of KOH.

A sample of potassium humates, such as to contain 8 grams of humic acids and a variable percent level of potassium are treated according to as disclosed in Example 1.

Table 5 reports, for several percent potassium levels, by weight, in the initial humate under dry conditions, the weight losses occurred owing to the thermal treatment, the values of B.E.T. surface area (m$^2$/g), and the values of specific pore volume (cm$^3$/g).

TABLE 5

| No. | K % | Charring weight Loss | B.E.T. surface area | Specific pore volume |
| --- | --- | --- | --- | --- |
| 20 | 25 | 34 | 1806 | 1.418 |
| 21 | 39 | 26 | 2247 | 1.211 |

We claim:

1. A process for producing activated charcoal, comprising the steps of:
   (a) oxidizing coal to form a carbonaceous substance containing humic acids;
   (b) separating said humic acids from said carbonaceous substance in the form of potassium humates and/or humic acids;
   (c) mixing said potassium humates and/or humic acids with an activating agent selected from the group consisting of KOH and K$_2$CO$_3$ or their mixtures in a weight ratio of activating agent to potassium humates and/or humic acids of from 0.1:1 to 10:1 to form a humate/activating agent mixture;
(d) when said mixing (c) is performed in aqueous solution, drying said humate/activating agent mixture;
(e) heat treating said dry humate/activating agent mixture in an inert atmosphere at a temperature within the range of 400° C. to 1200° C.;
(f) recovering from the product of step (e) an activated charcoal, by separating the activating agent, which is then recycled.

2. Process according to claim 1, in which the carbonaceous substance is potassium humate.

3. Process according to claim 1, in which the activating agent is KOH.

4. Process according to claim 1, in which the thermal treatment is carried out at a temperature comprised within the range of from 700° to 1,000° C.

5. Process according to claim 1, in which the overall ratio, by weight, of the activating agent to potassium humates and/or humic acids, is comprised within the range of from 0.2:1 to 5:1.

* * * * *